Patented Jan. 23, 1951

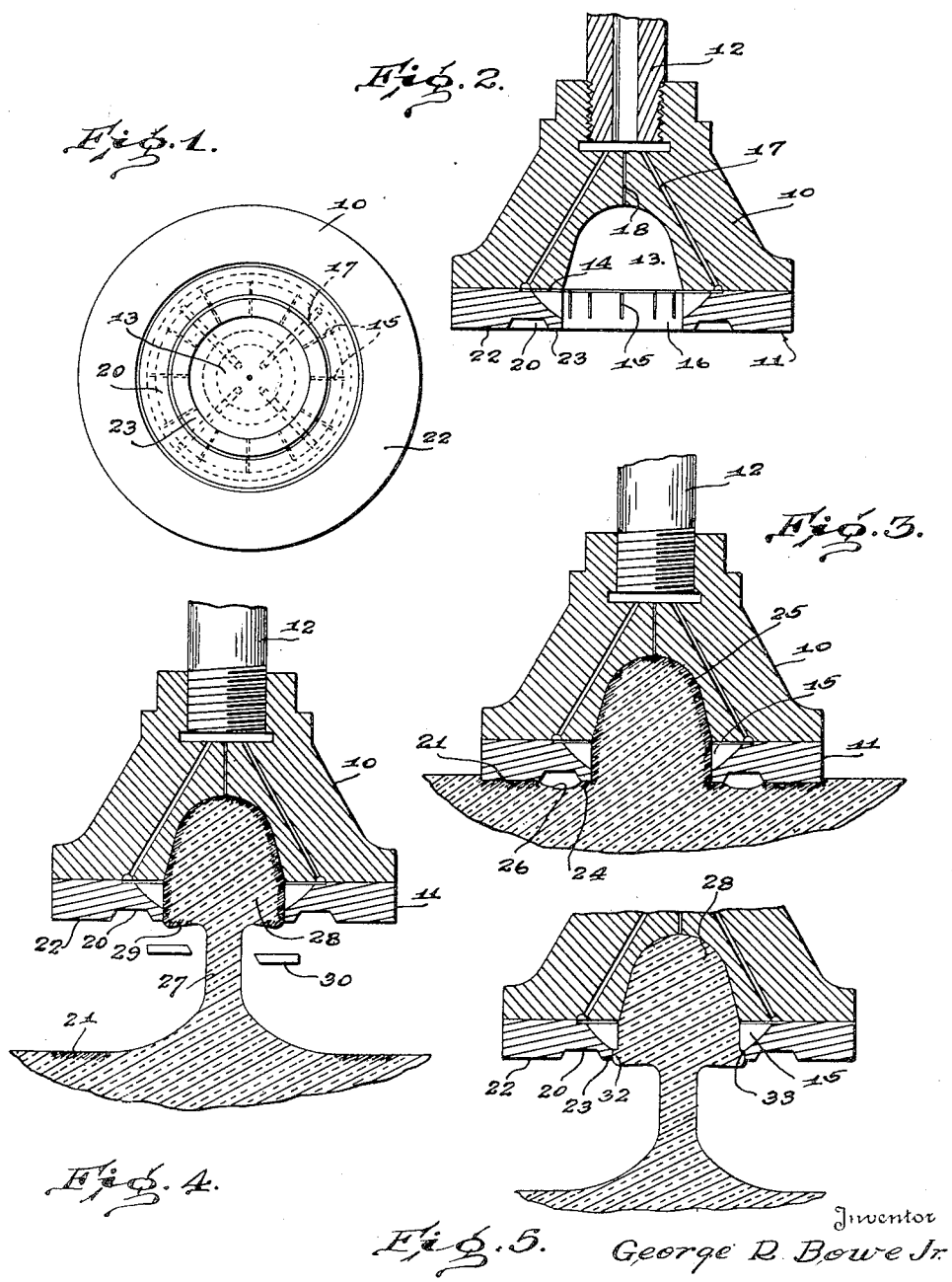

2,539,114

UNITED STATES PATENT OFFICE 2,539,114

SUCTION GATHERING GLASS MOLD

George R. Bowe, Jr., South Bend, Ind., assignor, by mesne assignments, to Owens-Illinois Glass Company, Toledo, Ohio, a corporation of Ohio Original application April 17, 1943, Serial No. 483,433. Divided and this application February 19, 1947, Serial No. 729,493

8 Claims. (Cl. 49—65)

My invention relates to apparatus for gathering mold charges or blanks of glass by suction into a gathering mold or cup from a pool of the molten glass.

One of the principal methods in use at the present time, known as the suction method, for segregating mold charges or gobs of glass from a molten supply body, consists in lowering a gathering mold open at its lower end, into sealing contact with a pool or body of molten glass, filling the cavity by suction, lifting the mold and severing the gathering glass from the supply body, as by means of a knife or shears.

When the mold is lifted from the surface of the pool, a column of glass uniting the gathered charge with the glass in the pool, is drawn upward with the mold, owing to the viscous nature of the glass. This column is ordinarily of substantially the same diameter as the bottom opening through which the charge of glass is drawn into the mold cavity, except that when the mold is lifted a considerable distance above the pool before the glass is severed, there is a certain amount of necking-in or constriction of the column of glass at a distance below the mold. When this column of glass is severed from the gathered charge, the glass is chilled by the knife or shears and a so-called "cut-off scar" is produced at the plane of severance. This scar usually appears as a defect in the finished ware, as the blowing or molding operation does not fully eliminate the scar. Numerous expedients have been resorted to in an endeavor to overcome this difficulty, many of them involving reheating operations and other methods and means for removing or reducing the scar.

An object of the present invention is to provide a novel suction gathering mold and cooperating means for effecting a necking-in or constriction of the column of glass immediately below the gathering mold when the latter is withdrawn from the supply body, and thereby greatly reducing the cross-sectional area of the glass at the plane of severance. In this manner the severing of the glass is greatly facilitated and the area of chilled glass and the chilling effect reduced to a point which permits the cut-off scar to be eliminated without difficulty during the subsequent blowing or molding operations. The present invention further permits the production of mold charges or blanks which may be fabricated into finished articles by methods which are impractical when the usual cut-off scars are present.

Other objects of the invention will appear hereinafter.

The present application is a division of my copending application for Suction Methods of Gathering Molten Glass, Serial Number 483,433, on which Patent No. 2,425,592 was granted August 12, 1947.

Referring to the accompanying drawings which illustrate a suction gathering mold constructed in accordance with my invention:

Fig. 1 is a bottom plan view of the mold;

Fig. 2 is a sectional elevation of the same;

Figs. 3 and 4 illustrate steps in the method of gathering a charge of glass. Fig. 3 shows the mold in sealing contact with the pool of glass and the mold cavity filled by suction. Fig. 4 shows the mold with its charge lifted away from the pool and the column of glass necked-in prior to severance; and Fig. 5 is a view similar to Fig. 4 but showing a somewhat modified construction by which a flange or lip may be produced on the lower end of the mold charge.

The mold comprises a body 10 and a disk-shaped plate 11 attached to the bottom surface of said body, said parts made of iron or other suitable metal. The mold is attached to the lower end of a tubular gathering spindle 12. The mold is formed with a downwardly opening cavity 13. An annular vacuum groove 14 surrounding the mold cavity is formed by cutting away a portion from the upper surface of the disk. Vertical, radially disposed vacuum slots 15 are cut in the mold cavity wall surface 16 of the plate 11, said slots being arranged in an annular series. A series of feeding vacuum holes or bores 17 extend from the lower end of the spindle 12 in downwardly and outwardly inclined directions to the periphery of the annular slot 14. A central opening 18 also extends from the spindle to the mold cavity. The construction as thus far described is not new.

I have discovered that by forming an annular recess 20 of suitable size, shape and location, in the bottom face of the plate 11, a radical change is produced in the manner in which the glass operates when the mold with its charge of glass is withdrawn from the pool. When the mold is lowered into sealing contact with the supply body or pool of glass the surface of the plate 11 which contacts with the glass produces a local surface chilling of the glass. Thus as indicated in Fig. 3 an annular chilled surface portion 21 is produced by the annular metal surface 22 defined by the periphery of the disk 11 and the outer edge of the annular recess 20. Between the recess 20 and the mold cavity wall 16 is an annular bottom surface portion 23 which likewise chills an annular surface portion 24 of the glass with which it contacts during the gathering operation. This chilled ring of glass form a continuation of the chilled skin or layer 25 formed on the surface of the gathered charge which contacts with the mold walls. Between the chilled portions 21 and 24 is an annular surface portion 26 beneath the recess 20 which is not brought in contact with the mold and therefore is not chilled but remains relatively hot and fluent.

As the mold is lifted with a charge of glass therein, as shown in Fig. 4, the column 27 of glass which unites the gathered charge 28 or blank with the supply body, is constricted or narrowed-in to a much smaller diameter than the opening of the mold cavity. In this manner a substantially horizontal bottom surface 29 is formed on the blank 28, just below the bottom surface of the mold and uniting substantially at right angles with the vertical surface of the column or neck 27. The gather of glass may be severed in a conventional manner by a knife or a pair of shears 30.

The operation by which the neck portion is so greatly constricted is dependent apparently upon the formation of the chilled annular surface portion 21 with a hot fluent annular surface 26 interposed between the chilled ring 21 and the gathered charge 28.

When the mold is lifted away from the pool, the blank of glass is held by suction in the mold and lifted therewith. Owing to the viscosity of the glass the column 27 is gradually formed and drawn upwardly, the glass comprised in this column being drawn from the molten supply body. Gravity exerts a downward pull opposing the upward movement of the column. The result of the several forces acting on the glass is a necking-in. The inward movement of the glass which forms the column is apparently localized by the chilled ring of glass 21 surrounding the more fluent surface portion 26 so that the inward movement of glass during the formation of the column is largely from that portion of the supply body immediately beneath and adjacent to the surface 26. When the recess 20 is omitted, the chilled portion of glass covers the entire area between the mold cavity and the periphery of the mold which would interfere with such necking-in of the glass as the mold rises.

In order to obtain an effective necking-in of the glass, it is desirable to maintain the dimensions of the recess 20 and also the width of the annular surface portions 22 and 23 within certain prescribed limits. With a mold of the shape shown in the drawings and having a diameter of about 2¾ inches, satisfactory results are obtained when the proportions shown in the drawings are maintained. In such a mold the groove 20 should be at least as wide as shown. Good results may be obtained with a wider groove but if of substantially less width it is comparatively ineffective. The width of the annular surface 22 may be greater than shown but should not be less. The width of the annular surface 23 should not be greater than shown and may be less, although any material reduction in this width may result in burning of the mold by the intensely hot molten glass.

Fig. 5 shows a somewhat modified construction adapted for forming a bottom flange or bead 32 on the blank 28. For this purpose the lower edge portion of the plate 11 is cut away along the mold cavity surface 16 to provide an annular recess 33 in which the bead is formed. In this instance the vacuum slots 15 extend downward to said recess 33.

Modifications may be restorted to within the spirit and scope of my invention.

I claim:

1. A glass gathering mold having a downwardly opening mold cavity and a horizontal flat bottom, said bottom formed with an annular recess extending upwardly therein and spaced from and surrounding the mold cavity, the wall surface of said recess being continuous and imperforate throughout, so that the recess provides a sealed chamber when the mold bottom is in sealing contact with the glass.

2. A glass gathering mold having a downwardly opening circular mold cavity and formed with an annular recess in the bottom of the mold surrounding, spaced from and concentric with the mold cavity, the wall surface of said recess being continuous and imperforate throughout, so that the recess provides a sealed chamber when the mold bottom is in sealing contact with the glass.

3. A glass gathering mold having a downwardly opening circular mold cavity and formed with an annular recess in the bottom of the mold surrounding, spaced from and concentric with the mold cavity, the annular surface portion of the mold between said recess and the mold cavity being substantially narrower than the said recess, the wall surface of said recess being continuous and imperforate throughout, so that the recess provides a sealed chamber when the mold bottom is in sealing contact with the glass.

4. A glass gathering mold having a downwardly opening circular mold cavity and formed with an annular recess in the bottom of the mold surrounding, spaced from and concentric with the mold cavity, the annular surface portion of the mold between said recess and the mold cavity being substantially narrower than the said recess, said bottom surface also including an annular portion surrounding said annular recess and of greater width than the recess, the wall surface of said recess being continuous and imperforate throughout, so that the recess provides a sealed chamber when the mold bottom is in sealing contact with the glass.

5. A suction gathering glass mold having a downwardly opening cup-shaped mold cavity, circular in cross section, the mold having a horizontal substantially flat bottom, said bottom being formed with an annular recess concentric with and spaced from the mold cavity, the width of said recess at the bottom being materially greater than its depth, the wall surface of said recess being continuous and imperforate throughout, so that the recess provides a sealed chamber when the mold bottom is in sealing contact with the glass.

6. A suction gathering glass mold having a downwardly opening cup-shaped mold cavity, circular in cross section, the mold having a horizontal substantially flat bottom, said bottom being formed with an annular recess concentric with and spaced from the mold cavity, the width of said recess at the bottom being materially greater than its depth and greater than the distance between said recess and the mold cavity, the wall surface of said recess being continuous and imperforate throughout, so that the recess provides a sealed chamber when the mold bottom is in sealing contact with the glass.

7. A glass gathering mold having a downwardly opening circular mold cavity and formed with an annular recess in the bottom of the mold surrounding, spaced from and concentric with the mold cavity, the mold being formed with an annular series of vertically disposed vacuum slots opening through the mold walls into said mold cavity, said vacuum slots terminating at points above the bottom surface of the mold.

8. A glass gathering suction mold having a downwardly opening cup-shaped mold cavity, circular in cross section, the mold being formed with an annular recess in the bottom thereof surrounding, spaced from, and concentric with the mold cavity, the mold cavity wall being formed with a recess extending throughout the circumference thereof closely adjacent to the bottom edge of said wall for forming an annular bead on the mold charge when the latter is drawn by suction into the mold, the wall surface of said first mentioned recess being continuous and imperforate throughout, so that the recess provides a sealed chamber when the mold bottom is in sealing contact with the glass.

GEORGE R. BOWE, Jr.

REFERENCES CITED

The following references are of record in the file of this patent:

UNITED STATES PATENTS

| Number | Name | Date |
|---|---|---|
| 1,223,392 | Kadow | Apr. 24, 1917 |
| 1,807,095 | Treece | May 26, 1931 |
| 1,986,449 | Schutz | Jan. 1, 1935 |